(12) United States Patent
Sensui

(10) Patent No.: US 6,393,219 B1
(45) Date of Patent: May 21, 2002

(54) MULTIPOINT FOCUS DETECTING APPARATUS

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/694,476

(22) Filed: Oct. 24, 2000

(30) Foreign Application Priority Data

Oct. 25, 1999 (JP) .......................................... 11-302560P (51) Int. Cl.[7] .............................. G03B 7/28; G02B 27/10
(52) U.S. Cl. ...................... 396/114; 396/121; 396/111; 359/618
(58) Field of Search ................................. 396/104, 111, 396/114, 121; 250/201.8; 359/618

(56) References Cited

U.S. PATENT DOCUMENTS

| | | | | |
|---|---|---|---|---|
| 4,716,431 A | * | 12/1987 | Shindo | ........................ 396/114 |
| 5,005,041 A | | 4/1991 | Suda et al. | |
| 5,017,005 A | | 5/1991 | Shindo | |
| 5,321,248 A | * | 6/1994 | Sensui | ..................... 250/201.8 |
| 5,397,887 A | | 3/1995 | Sensui | |

FOREIGN PATENT DOCUMENTS

| | | |
|---|---|---|
| JP | 1-120518 | 5/1989 |
| JP | 6-88938 | 3/1994 |

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A multipoint focus detecting apparatus of a camera includes a plurality of exit-pupil dividing devices, pairs of light distribution forming devices, a plurality of array type photoelectric conversion sensors, a focus detection zone determining device, and at least one condenser lens positioned between the focus detection zone determining device and the plurality of exit-pupil dividing devices. An exit surface of the condenser lens(es) is formed as a curved surface in both a direction of an optical axis of the photographing lens and a first direction, and is further formed as an aspherical surface in cross section in both the direction of the optical axis of the photographing lens and the second direction, so that the exit pupil and the plurality of exit-pupil dividing devices become optically conjugate to each other in the first direction.

9 Claims, 5 Drawing Sheets

MULTIPOINT FOCUS DETECTING APPARATUS

BACKGROUND OF THE INVENTION

1. Field of the Invention

The present invention relates to a multipoint focus detecting apparatus which can determine a focus state at each of a plurality of focus detection zones, and which is suitable for an optical instrument such as an SLR camera.

2. Description of the Prior Art

In recent years, SLR cameras provided with a multipoint focus detecting unit for determining a focus state (defocus) at each of a plurality of focus detection zones (focusing points) have been developed. A typical conventional exit-pupil-dividing multipoint focus detecting unit is provided with a plurality of exit-pupil dividing devices, a plurality of pairs of light distribution forming devices and a plurality of array type photoelectric conversion sensors (e.g., CCD line sensors). Each exit-pupil dividing device functions to divide the exit pupil of a photographing lens into two detection sub-zones. Each exit-pupil dividing device is composed of, e.g., a separator mask having a pair of apertures. Each pair of light distribution forming devices receive light bundles which are passed through the corresponding aforementioned two detection sub-zones to form a corresponding pair of light distributions, respectively, whose relative positions vary in accordance with the variation in position of the focal point of the photographing lens. Each pair of light distribution forming devices are composed of, e.g., a pair of separator lenses. The plurality of array type photoelectric conversion sensors are arranged in a direction orthogonal to the direction in which the exit pupil of the photographing lens is divided by each of the aforementioned exit-pupil dividing devices. The conventional exit-pupil-dividing multipoint focus detecting unit is further provided with an opaque field mask (focus detection zone determining plate) having a plurality of apertures which determine the plurality of focus detection zones, respectively. The field mask is positioned in a plane located at a position optically equivalent with a film surface (i.e., a focal plane of the photographing lens). Each of the plurality of apertures of the field mask determines the size of the bundle of rays which are incident on the corresponding separator mask (the exit-pupil dividing device). However, the size of each array type photoelectric conversion sensor is generally smaller than that of the corresponding focus detection zone, while the space between two adjacent array type photoelectric conversion sensors is generally narrower than that between the corresponding two adjacent focus detection zones. For this reason, the conventional exit-pupil-dividing multipoint focus detecting unit is further provided between the field mask and the exit-pupil dividing devices with at least one condenser lens (sometimes with at least one prism) for converging each of the object light bundles which are respectively passed through the focus detection zones (i.e., the apertures) of the field mask and for deflecting each object light bundle in a direction of passing through the corresponding separator mask (the exit-pupil dividing device) so that the light distribution of the object light bundle (i.e., a object image) is formed on the corresponding array type photoelectric conversion sensor via the corresponding pair of separator lenses (the corresponding pair of light distribution forming devices).

Figure 5A:
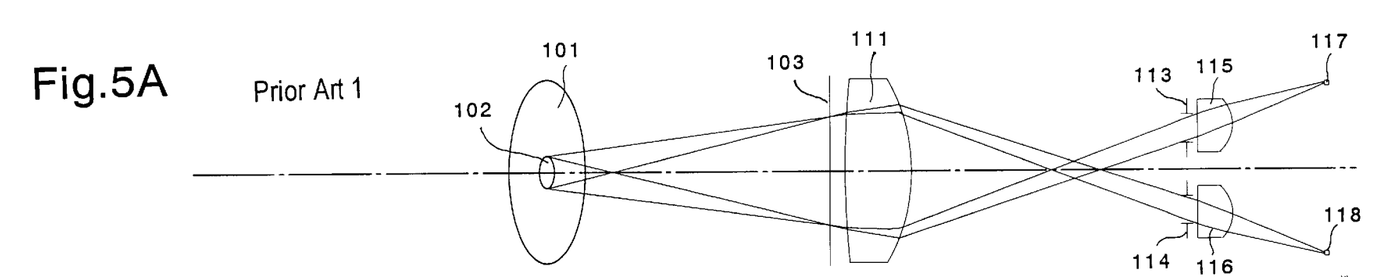
FIG. 5A is a schematic diagram of fundamental elements of an optical system of a conventional multipoint focus detecting apparatus.
Figure 5B:
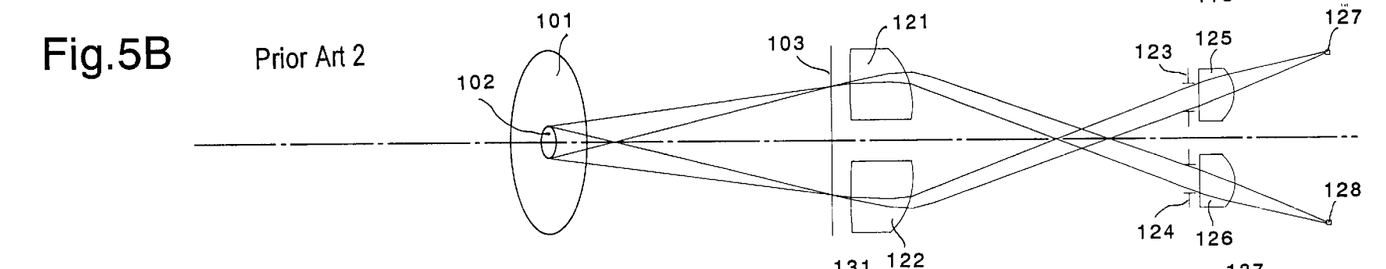
FIG. 5B is a schematic diagram of fundamental elements of an optical system of another conventional multipoint focus detecting apparatus.
Figure 5C:
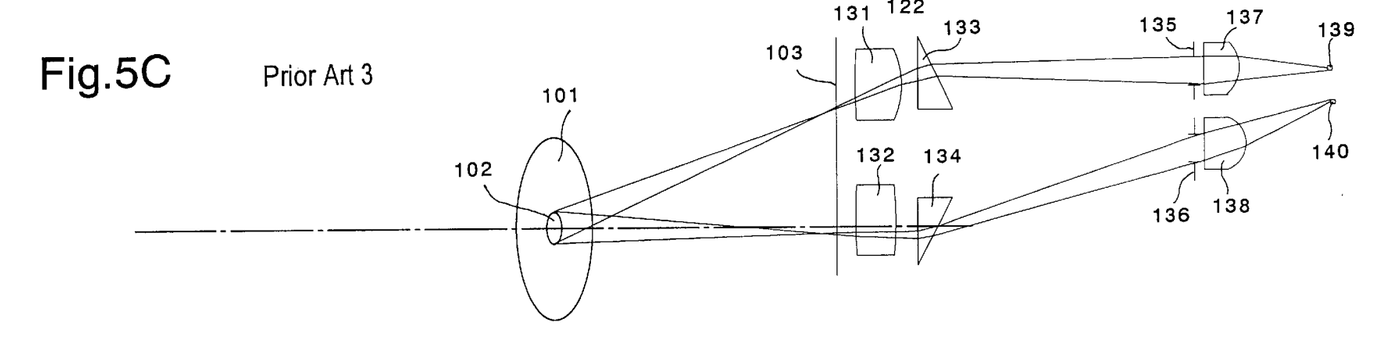
FIG. 5C is a schematic diagram of fundamental elements of an optical system of another conventional multipoint focus detecting apparatus.

FIGS. 5A, 5B and 5C each show a diagram of fundamental elements of a focus detection optical system of a conventional multipoint focus detecting apparatus. In each of these drawings, reference numerals 101, 102 and 103 represent the exit pupil of a photographing lens, the entrance pupil of the focus detection optical system and the aforementioned field mask, respectively.

In the focus detection optical system of a conventional multipoint focus detecting apparatus shown in FIG. 5A, two object light bundles which are passed through two focus detection zones (i.e., two apertures) of the field mask 103 are converged and deflected by a rotationally-symmetrical condenser lens 111 toward two separator masks (the aforementioned exit-pupil dividing devices) 113 and 114, respectively, so that the light distribution of each object light bundle (i.e., a object image) is formed on the corresponding line sensor (the aforementioned array type photoelectric conversion sensor) 117 or 118 via the corresponding pair of separator lenses (the corresponding pair of light distribution forming devices) 115 or 116. In this conventional multipoint focus detecting apparatus shown in FIG. 5A, more than one focus detection zone of the field mask 103 are covered by a single condenser lens, i.e., the rotationally-symmetrical condenser lens 111. Since the condenser lens 111 has the same power in both horizontal and vertical directions and is rotationally symmetrical about the optical axis thereof, neither the light distribution of the object light bundle formed on each of the two line sensors 117 and 118 nor the distortion thereof can be corrected by the condenser lens 111, even though the exit pupil 101 and the entrance pupil 102 are successfully made to coincide with each other in both horizontal and vertical directions by the condenser lens 111. Therefore, neither the area of each focus detection zone of the field mask 103 nor the space between the two focus detection zones of the field mask 103 can be made large. Furthermore, if it is attempted to make the exit pupil 101 and the entrance pupil 102 coincide with each other, the degree of freedom in arrangement of the separator masks 113 and 114 is somewhat restricted.

In the focus detection optical system of a conventional multipoint focus detecting apparatus shown in FIG. 5B, a condenser lens is disposed for each focus detection zone, namely, two condenser lenses 121 and 122 are disposed for the two focus detection zones of the field mask 103, respectively. In the focus detection optical system of this conventional multipoint focus detecting apparatus, two object light bundles which are passed through the two focus detection zones of the field mask 103 are converged and deflected by two condenser lenses 121 and 122 to two separator masks (the aforementioned exit-pupil dividing devices) 123 and 124, respectively, so that the light distribution of each object light bundle (i.e., a object image) is formed on the corresponding line sensor (the aforementioned array type photoelectric conversion sensor) 127 or 128 via the corresponding pair of separator lenses (the corresponding pair of light distribution forming devices) 125 or 126. In this conventional multipoint focus detecting apparatus shown in FIG. 5B, since a condenser lens (121 or 122) is disposed for each of the two focus detection zones of the field mask 103, the exit pupil 101 and the entrance pupil 102 can be made to coincide with each other in both horizontal and vertical directions by the condenser lens 121 and 122, and at the same time, the light distribution of the object light bundle formed on each of the two line sensors 127 and 128 and the distortion thereof can be corrected by the condenser lenses 121 and 122. However, in this conventional multipoint focus detecting apparatus, more than one condenser lens is required, which extensively increases the number of lens surfaces that are to be formed on molded condenser lenses.

In the focus detection optical system of a conventional multipoint focus detecting apparatus shown in FIG. 5C, a condenser lens is disposed for each focus detection zone, namely, two condenser lenses 131 and 132 are disposed for the two focus detection zones of the field mask 103, respectively. Furthermore, a prism is disposed for each condenser lens; namely, two prisms 133 and 134 are disposed for the two condenser lenses 131 and 132, respectively. Each of the two prisms 133 and 134 deflects a bundle of rays which are passed through the corresponding condenser lens 131 or 132 so that the two light bundles, which are respectively passed through the two condenser lenses 131 and 132, approach each other. According to this optical structure, the space between the two pairs of object images which are respectively formed on two line sensors 139 and 140 via two separator masks 135 and 136 and two pairs of separator lenses 137 and 138 becomes small, which makes it possible to arrange the two line sensors 139 and 140 to be close to each other. However, in this conventional multipoint focus detecting apparatus, a condenser lens and a prism are required for each focus detection zone, so that the number of elements of the focus detection optical system increases. This makes it difficult to assemble the multipoint focus detecting apparatus.

In order to reduce detection error, the condenser lens (or lenses) used as an element (or elements) of the focus detection optical system of an exit-pupil-dividing multipoint focus detecting apparatus should satisfy the following three conditions (1) through (3), and it is preferable for the overall focus detection optical system to satisfy the following three conditions (4) through (6):

(1) The exit pupil of the photographing lens and the exit-pupil dividing devices (separator masks) are optically conjugate to each other in the direction in which the exit pupil of the photographing lens is divided by each of the exit-pupil dividing devices.

(2) The exit pupil of the photographing lens and the exit-pupil dividing devices (separator masks) are optically conjugate to each other in a direction orthogonal to the direction in which the exit pupil of the photographing lens is divided by each of the exit-pupil dividing devices.

(3) The light distribution of the object light bundle formed on each line sensor and the distortions thereof are adequately corrected.

(4) The degree of freedom in arrangement and structure of each element of the focus detection optical system is high.

(5) The number of elements of the focus detection optical system is as small as possible.

(6) The plurality of focus detection zones can be arranged in a wide range and/or the area of each focus detection zone is large.

However, in the focus detection optical system of a conventional exit-pupil dividing multipoint focus detecting apparatus, although conditions (1) through (3) are moderately satisfied by the condenser lens (or lenses), conditions (4) through (6) are not satisfied. Specifically, there are no conventional exit-pupil-dividing multipoint focus detecting apparatuses which can satisfy condition (6).

SUMMARY OF THE INVENTION

The present invention has been developed in view of the aforementioned problems in conventional multipoint focus detecting apparatuses, and an object of the present invention is to provide a multipoint focus detecting apparatus which makes it possible for a plurality of focus detection zones to be set in a wide range and/or that the area of each focus detection zone to be made large, without increasing the number of elements of the focus detection optical system and without deteriorating the precision in focus detection.

To achieve the object mentioned above, according to an aspect of the present invention, a multipoint focus detecting apparatus of a camera is provided, including a plurality of exit-pupil dividing devices for dividing an exit pupil of a photographing lens into a plurality of detection sub-zones in a first direction; a plurality of pairs of light distribution forming devices, each pair receiving light bundles which are passed through a corresponding pair of the plurality of detection sub-zones to form a corresponding pair of light distributions, respectively, relative positions of which vary in accordance with a variation in position of a focal point of the photographing lens; a plurality of array type photoelectric conversion sensors arranged in a second direction orthogonal to the first direction in which the exit pupil is divided by each of the plurality of exit-pupil dividing devices; a focus detection zone determining device that is positioned in a plane located substantially at a position optically equivalent with a focal plane of the photographing lens to determine a plurality of focus detection zones; and at least one condenser lens positioned between the focus detection zone determining device and the plurality of exit-pupil dividing devices so that light bundles which are respectively passed through the plurality of focus detection zones pass through the at least one condenser lens. An exit surface of the at least one condenser lens is formed as a curve in cross section taken along a plane extending in both a direction of an optical axis of the photographing lens and the first direction, and is further formed as a curve having a varying curvature in cross section taken along a plane extending in both the direction of the optical axis of the photographing lens and the second direction, so that the exit pupil and the plurality of exit-pupil dividing devices become optically conjugate to each other in the first direction.

According to this arrangement, the exit pupil of the photographing lens and the exit-pupil dividing devices become optically conjugate to each other, and at the same time, the light distribution of the object light bundle formed on each line sensor and the distortion thereof are moderately corrected. This makes it possible for the plurality of focus detection zones to be set in a wide range and/or that the area of each focus detection zone to be made large with a high degree of precision in focus detection. Further, since the plurality of bundle of rays which are respectively passed through the plurality of focus detection zones are converged and deflected by a single condenser lens, it is easy to make and assemble the condenser lens, while the degree of freedom in arrangement of the condenser lens is high.

Preferably, the exit surface is rotationally-asymmetrical about the optical axis thereof.

Preferably, at least one condenser lens is a single condenser lens, so that the light bundles which are respectively passed through the plurality of focus detection zones pass through the single condenser lens.

Preferably, each of the plurality of exit-pupil dividing devices is a separator mask having at least one aperture.

Preferably, each pair of the plurality of pairs of light distribution forming devices is a pair of separator lenses.

Preferably, each of the plurality of array type photoelectric conversion sensors is a CCD line sensor.

Preferably, the focus detection zone determining device is a field mask having a plurality of apertures which determine the plurality of focus detection zones, respectively.

Preferably, the multipoint focus detecting apparatus is incorporated in an SLR camera.

According to another aspect of the present invention, a multipoint focus detecting apparatus of an AF camera, includes a first opaque plate that is positioned in a plane located substantially at a position optically equivalent with a focal plane of a photographing lens of the AF camera, the opaque plate including a plurality of apertures respectively determining a plurality of focus detection zones; at least one second opaque plate for dividing an exit pupil of a photographing lens into a plurality of detection sub-zones, each of the at least one second opaque plate having at least two apertures; a plurality of pairs of separator lenses, each of the pairs of separator lenses receiving light bundles which are passed through a corresponding pair of the plurality of detection sub-zones to form a corresponding pair of light distributions, respectively, relative positions of which vary in accordance with a variation in position of a focal point of the photographing lens; a plurality of line sensors arranged in a second direction orthogonal to a first direction in which the exit pupil is divided by each of the at least one second opaque plate; and a condenser lens positioned between the first opaque plate and the at least one second opaque plate so that light bundles which are respectively passed through the plurality of focus detection zones pass through the condenser lens. An exit surface of the condenser lens is formed as a curve in cross section taken along a plane extending in both a direction of an optical axis of the photographing lens and the first direction, and is further formed as a curve having a varying curvature in cross section taken along a plane extending in both the direction of the optical axis of the photographing lens and the second direction, so that the exit pupil and the at least one second opaque plate become optically conjugate to each other in the first direction.

The present disclosure relates to subject matter contained in Japanese Patent Application No. 11-302560 (filed on Oct. 25, 1999) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 4:
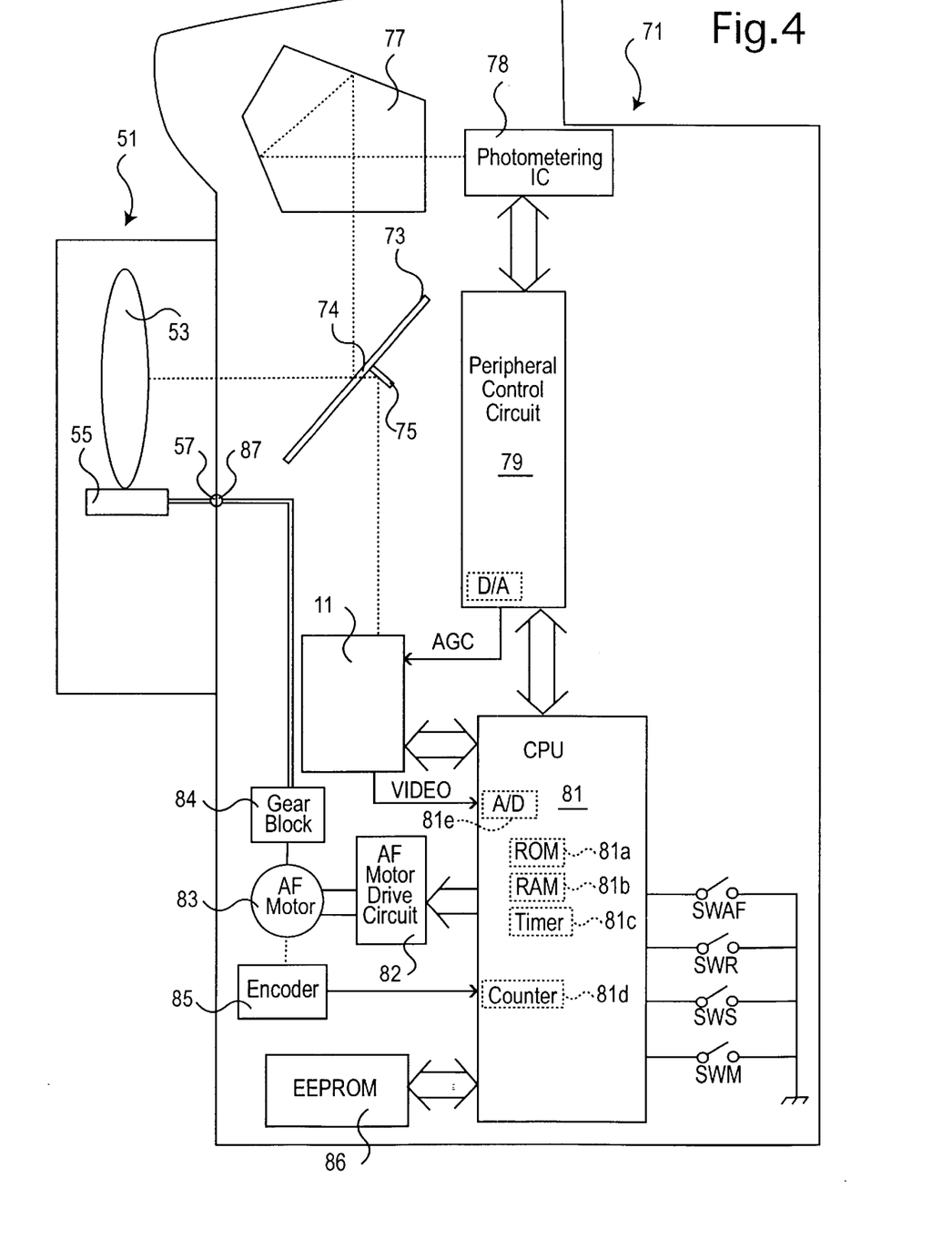
FIG. 4 is a block diagram of fundamental components of a single lens reflex camera provided with the multipoint focus detecting apparatus according to the present invention.

FIG. 4 shows a block diagram of fundamental elements of an SLR (single-lens-reflex) camera system provided with a multipoint focus detecting apparatus to which the present invention is applied. The autofocus SLR camera system includes a camera body 71 and an interchangeable photographing lens 51 detachably attached to the camera body 71. The camera body 71 is provided with a multipoint focus detecting apparatus and an autofocusing device (multipoint autofocusing system).

A major part of object light bundle (light which is to form an object image to be photographed) entering the camera body 71 through the photographing lens 51 is reflected by a main mirror (quick-return mirror) 73 toward a pentagonal prism 77, which is a fundamental element of a finder optical system provided in the camera body 71. Subsequently, the object light bundle is reflected more than once by the pentagonal prism 77 and emerges out of an eyepiece (not shown) positioned behind the pentagonal prism 77. Part of the light reflected by the pentagonal prism 77 enters a light-receiving element of a photometering IC 78. Part of the object light bundle which is incident on the main mirror 73 passes through a half mirror portion 74 provided on the main mirror 73 to be reflected downwardly by an auxiliary mirror 75 provided at the rear of the main mirror 73. The light reflected downwardly by the auxiliary mirror 75 enters a multipoint AF sensor unit 11 provided as a multipoint focus detecting apparatus. The multipoint AF sensor unit 11 can be, for example, a phase-difference distance measuring sensor.

In this particular embodiment, although the multipoint AF sensor unit 11 is provided with more than two focus detection zones, only two of them and the corresponding optical elements of the multipoint AF sensor unit 11 will be hereinafter discussed for the purpose of simplifying the explanation. The two focus detection zones (i.e., two apertures (slots) 13b and 13a shown in FIG. 2) correspond to a right focus detection zone and a rightmost focus detection zone which are positioned in the field of view of a finder view (not shown) on the right side of the center of the field of view when the camera body 71 is held horizontally. The multipoint AF sensor unit 11 is provided with a first pair of line sensors (array type photoelectric conversion sensors) 19 (19a and 19b) and a second pair of line sensors (array type photoelectric conversion sensors) 20 (20a and 20b) to correspond to the right focus detection zone and the rightmost focus detection zone, respectively. As can be understood by those skilled in the art, each pair of line sensors can be replaced by a single line sensor.

The camera body 71 is provided with a main CPU 81 that manages the overall operations of the camera body 71. The output (integral data) of the multipoint AF sensor unit 11 is input to the main CPU 81. The multipoint AF sensor unit 11, a peripheral control circuit 79 to which the photometering IC 78 is connected, an AF motor drive circuit 82 for driving an AF motor 83, an encoder 85, and an EEPROM 86 are provided within the camera body 71 and are all connected to the main CPU 81. The main CPU 81 calculates a defocus amount for each of the first and second line sensors 19 and 20 in accordance with a predetermined operation, using integral data of each of the first and second line sensors 19 and 20 that are input from the multipoint AF sensor unit 11. Subsequently, the main CPU 81 determines the defocus amount to be used, and the priority thereof, in accordance with all the calculated defocus amounts to determine and calculate the rotational direction and the number of revolutions of the AF motor 83 (i.e., the number of pulses to be output from the encoder 85), respectively. Thereafter, the main CPU 81 drives the AF motor 83 via the AF motor drive circuit 82 in accordance with the determined rotational direction and the calculated number of revolutions. The main CPU 81 detects and counts the pulses output from the encoder 85 in association with the rotation of the AF motor 83. When the counted number of pulses reaches the calculated number of pulses, the main CPU 81 sends a signal to the AF motor drive circuit 82 to stop the AF motor 83.

Rotation of the AF motor 83 is transmitted to the photographing lens 51 through a gear block 84 and a connection between a joint 87 provided on a mount of the camera body 71 and another joint 57 provided on a corresponding mount of the photographing lens 51. The photographing lens 51 is provided therein with a lens drive mechanism 55 for transmitting the rotation of the joint 57 to an AF lens group 53, so that the AF lens group 53 is driven by the AF motor 83 via the gear block 84, the joints 87, 57 and the lens drive mechanism 55.

The main CPU 81 is provided therein with a ROM 81a in which predetermined programs are stored, a RAM 81b in which data for the calculating operation and control operation is temporarily stored, a counting reference timer 81c, a counter 81d, and an A/D converter 81e. The main CPU 81 controls the peripheral control circuit 79 to start operating to calculate an optimum combination of a shutter speed and an aperture value in accordance with photometry data input from the photometering IC 78. Subsequently, the main CPU 81 actuates a focal plane shutter (not shown) provided in the camera body 71 and an iris diaphragm (not shown) provided in the photographing lens 51 via the peripheral control circuit 79. Thereafter, upon the completion of an exposure, the main CPU 81 controls a film motor (not shown) to wind the film by one frame. The EEPROM 86 serving as an external memory is connected to the main CPU 81. The EEPROM 86 stores therein various inherent constants of the camera body 71 and predetermined values necessary for integration control.

A photometering switch SWS which is turned ON when a release button (not shown) is depressed by a half step, and a release switch SWR which is turned ON when the release button is fully depressed, are connected to the main CPU 81. ON/OFF data of each of the photometering switch SWS and the release switch SWR is input to the main CPU 81 so that the main CPU 81 performs predetermined operations in accordance with the ON state of each of the photometering switch SWS and the release switch SWR.

The photographing lens 51 is provided therein with the lens drive mechanism 55 for moving the AF lens group 53 along the optical axis thereof, and the joint 57 which can be connected to the joint 87 of the camera body 71 to transmit the rotation of the AF motor 83 to the lens drive mechanism 55. The photographing lens 51 is further provided with a ROM (not shown) which stores therein various inherent constants of the photographing lens 51, or a lens CPU (not shown) for calculating variable lens information. The ROM or the CPU of the photographing lens 51 exchanges necessary data or commands with the main CPU 81 when the photographing lens 51 is connected to the camera body 71.

Figure 1:
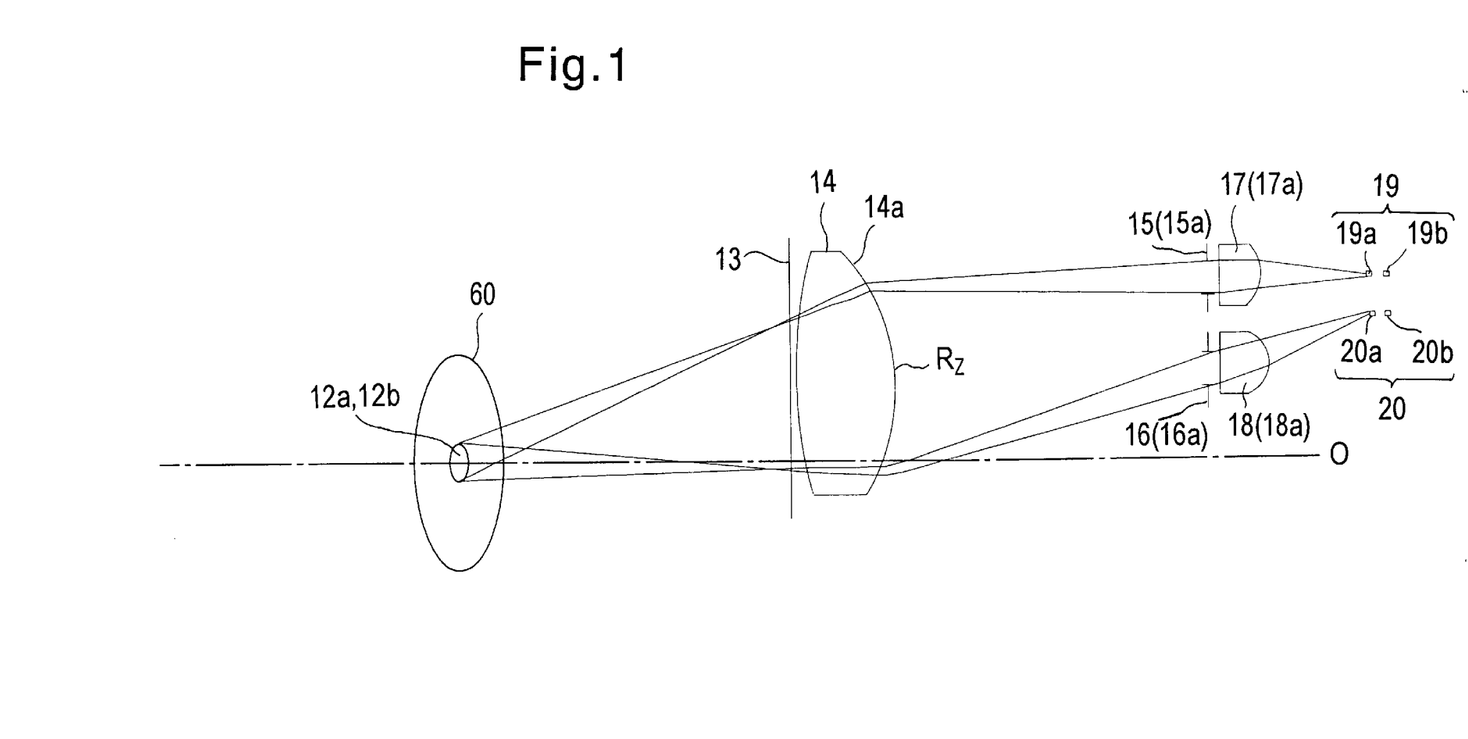
FIG. 1 is a schematic diagram of an embodiment of fundamental elements of an optical system of a multipoint focus detecting apparatus according to the present invention.
Figure 2:
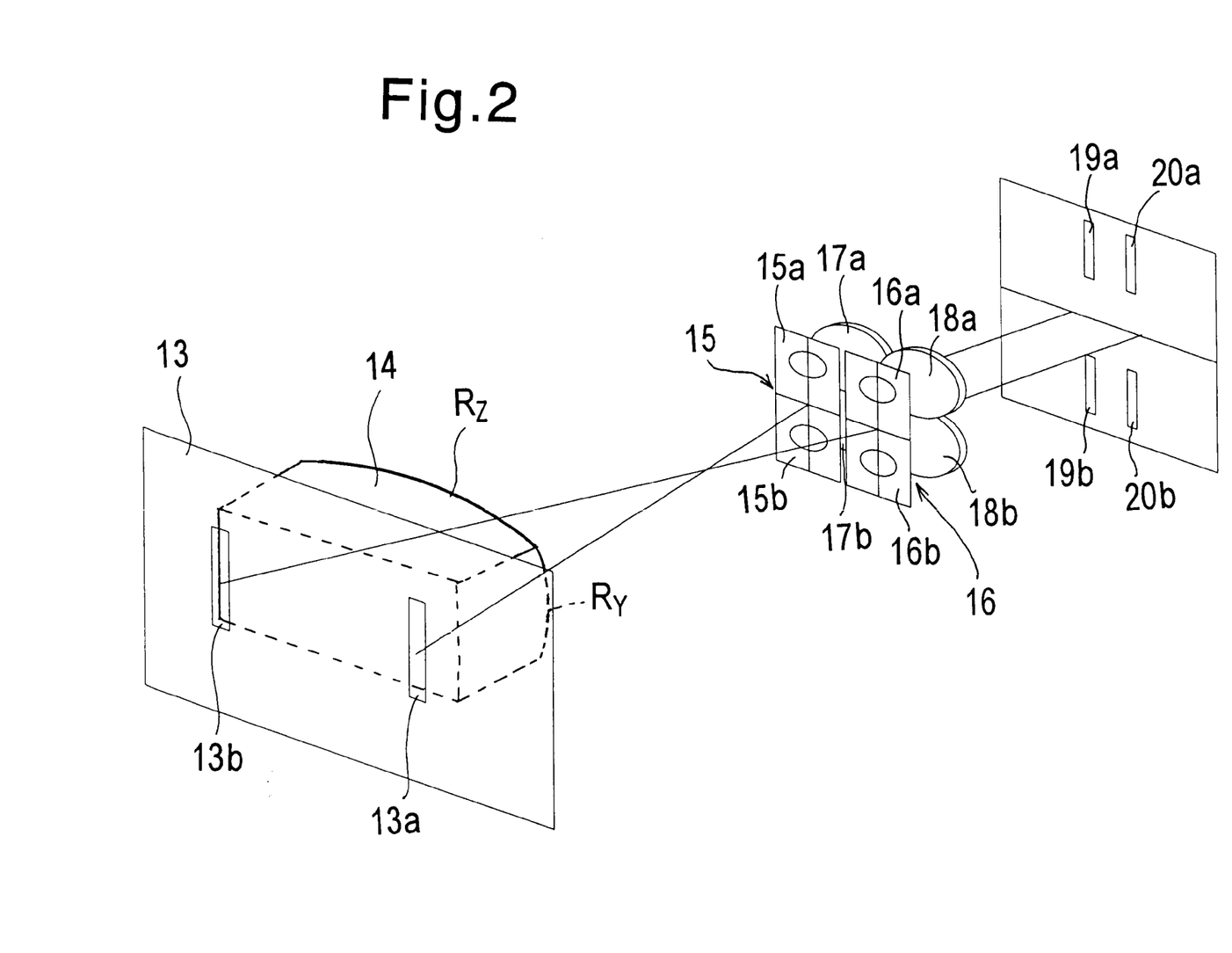
FIG. 2 is a perspective view of the optical system shown in FIG. 1, showing an embodiment of an arrangement of the optical elements thereof.
Figure 3:
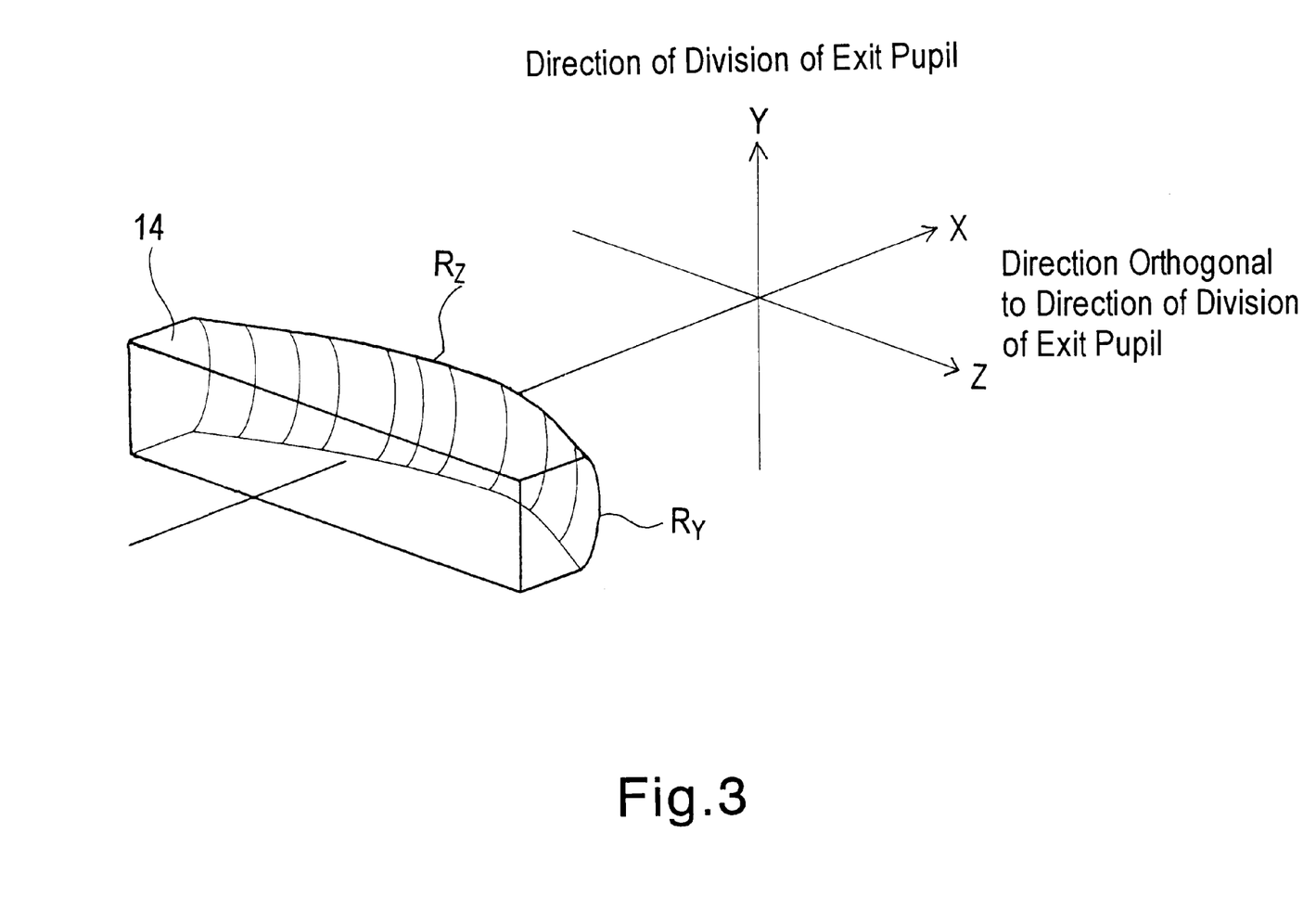
FIG. 3 is a perspective view of the condenser lens of the optical system shown in FIG. 1, showing the lens structure of the condenser lens.

The structure of the multipoint AF sensor unit 11 will be discussed in detail with reference to FIGS. 1 through 3. FIGS. 1 and 2 show an embodiment of fundamental elements of the focus detection optical system of a multipoint focus detecting apparatus according to the present invention. FIG. 2 shows a perspective view of the condenser lens of the optical system shown in FIG. 1.

The multipoint AF sensor unit 11 is provided with an opaque field mask (focus detection zone determining device/first opaque plate) 13 having two apertures 13a and 13b which determine two focus detection zones, respectively. The field mask 13 is positioned in a plane located substantially at a position optically equivalent with a film surface (i.e., a focal plane of the photographing lens 51) on which object images are formed through the photographing lens 51. The multipoint AF sensor unit 11 is further provided with a condenser lens 14, two separator masks (exit-pupil dividing devices/second opaque plates) 15 and 16, two pairs of separator lenses (two pairs of light distribution forming devices) 17 (17a and 17b) and 18 (18a and 18b), and the aforementioned first and second pairs of line sensors 19 (19a and 19b) and 20 (20a and 20b) in this order from left to right as viewed in FIG. 1. The separator mask 15 has two apertures 15a and 15b each defining a detection sub-zone. Likewise, the separator mask 16 has two apertures 16a and 16b each defining a detection sub-zone. Note that the two separator apertures 15a and 16a and exit pupils 12a and 12b thereof are shown in FIG. 1, but the other two separator mask portions 15b and 16b and the corresponding separator lenses 17b and 18b are not shown in FIG. 1. Two object light bundles which are passed through the two apertures (focus detection zones) 13a and 13b of the field mask 13 are converged and deflected by the condenser lens 14 toward the two separator masks 15 (15a and 15b) and 16 (16a and 16b), respectively, so that the light distribution of each object light bundle (i.e., a object image) is formed on the corresponding pair of line sensors 19 (19a and 19b) or 20 (20a and 20b) via the corresponding pair of separator lenses 17 (17a and 17b) or 18 (18a and 18b). Accordingly, a primary object image formed at the aperture 13a of the field mask 13 therein is divided into two images via the separator mask 15 (15a and 15b) to be re-formed on the pair of line sensors 19a and 19b as secondary object images (light distributions) whose relative positions (the space therebetween) vary in accordance with the variation in position of the focal point of the photographing lens via the pair of separator lenses 17a and 17b, respectively. Likewise, a primary object image formed at the aperture 13b of the field mask 13 therein is divided into two images via the separator mask 16 (16a and 16b) to be re-formed on the pair of line sensors 20a and 20b as secondary object images (light distributions) whose relative positions (the space therebetween) vary in accordance with the variation in position of the focal point of the photographing lens via the pair of separator lenses 18a and 18b, respectively.

In the present embodiment, the exit surface of the condenser lens is formed as a curve in cross section RY taken along a plane extending in both the direction of the optical axis O of the photographing lens 51 and direction Y of division of the exit pupil 60 of the photographing lens 51, and is further formed as a curve having a varying curvature (non-arc surface) in cross section RZ taken along a plane extending in both the direction of the optical axis O of the photographing lens 51 and direction Z orthogonal to direction Y. Accordingly, the aspherical surface in the cross section RZ is rotationally asymmetrical about the optical axis thereof.

The cross section RZ is formed as a curve having a varying curvature so that the exit pupil 60 becomes optically conjugate to the separator masks 15 and 16 (the separator mask portions 15a, 15b and 16a and 16b) in accordance with an arrangement of the two apertures 13a and 13b of the field mask 13, the separator apertures 15a, 15b and 16a and 16b and the two pairs of separator lenses 17a, 17b, 18a and 18b.

In the above illustrated embodiment, although the present invention is applied to a multipoint focus detecting apparatus which can detect a focus state at each of the two focus detection zones (the right focus detection and the rightmost focus detection zone) positioned in the field of view of the finder view on the right side of the center of the field of view when the camera body is held horizontally, the present invention can be generally applied to any other exit-pupil-dividing multipoint focus detecting apparatus.

As can be understood from the foregoing, according to the multipoint focus detecting apparatus to which the present invention is applied, since a surface of the condenser lens is formed so that the exit pupil of the photographing lens and the exit-pupil dividing devices become optically conjugate to each other, the light distribution of the object light bundle formed on each line sensor and the distortion thereof can be corrected by the condenser lens 111, and at the same time, the plurality of focus detection zones can be arranged in a wide range. Moreover, a focus state can be detected at each focus detection zone with a high degree of precision.

Furthermore, since more than one focus detection zone is covered by a single condenser lens, the number of elements of the focus detection optical system does not increase, which makes the degree of freedom in arrangement and structure of each element of the focus detection optical system high.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A multipoint focus detecting apparatus of a camera, comprising:
   a plurality of exit-pupil dividing devices for dividing an exit pupil of a photographing lens into a plurality of detection sub-zones in a first direction;
   a plurality of pairs of light distribution forming devices, each said pairs of light distribution forming devices receiving light bundles which are passed through a corresponding pair of said plurality of detection sub-zones to form a corresponding pair of light distributions, respectively, relative positions of which vary in accordance with a variation in position of a focal point of said photographing lens;
   a plurality of array type photoelectric conversion sensors arranged in a second direction orthogonal to said first direction in which said exit pupil is divided by each of said plurality of exit-pupil dividing devices;
   a focus detection zone determining device that is positioned in a plane located substantially at a position optically equivalent with a focal plane of said photographing lens to determine a plurality of focus detection zones; and
   at least one condenser lens positioned between said focus detection zone determining device and said plurality of exit-pupil dividing devices so that light bundles which are respectively passed through said plurality of focus detection zones pass through said at least one condenser lens;
   wherein an exit surface of said at least one condenser lens is a circular arc in cross section taken along a plane extending in both a direction of an optical axis of said photographing lens and said first direction, and is a non-circular arc in cross section taken along a plane extending in both said direction of said optical axis of said photographing lens and the second direction, so that said exit pupil and said plurality of exit-pupil dividing devices become optically conjugate to each other in said first direction.

2. The multipoint focus detecting apparatus according to claim 1, wherein said exit surface is rotationally-asymmetrical about the optical axis thereof.

3. The multipoint focus detecting apparatus according to claim 1, wherein said at least one condenser lens is a single condenser lens, so that said light bundles which are respectively passed through said plurality of focus detection zones pass through said single condenser lens.

4. The multipoint focus detecting apparatus according to claim 1, wherein each of said plurality of exit-pupil dividing devices comprises a separator mask having at least two apertures.

5. The multipoint focus detecting apparatus according to claim 1, wherein each pair of said plurality of pairs of light distribution forming devices comprises a pair of separator lenses.

6. The multipoint focus detecting apparatus according to claim 1, wherein each of said plurality of array type photoelectric conversion sensors comprises a CCD line sensor.

7. The multipoint focus detecting apparatus according to claim 1, wherein said focus detection zone determining device comprises a field mask having a plurality of apertures which determine said plurality of focus detection zones, respectively.

8. The multipoint focus detecting apparatus according to claim 1, wherein said multipoint focus detecting apparatus is incorporated in an SLR camera.

9. A multipoint focus detecting apparatus of an AF camera, comprising:
   a first opaque plate that is positioned in a plane located substantially at a position optically equivalent with a focal plane of a photographing lens of said AF camera, said opaque plate comprising a plurality of apertures respectively determining a plurality of focus detection zones;
   at least one second opaque plate for dividing an exit pupil of a photographing lens into a plurality of detection sub-zones, each of said at least one second opaque plate having at least two apertures;
   a plurality of pairs of separator lenses, each of said pairs of separator lenses receiving light bundles which are passed through a corresponding pair of said plurality of detection sub-zones to form a corresponding pair of light distributions, respectively, relative positions of which vary in accordance with a variation in position of a focal point of said photographing lens;
   a plurality of line sensors arranged in a second direction orthogonal to a first direction in which said exit pupil is divided by each of said at least one second opaque plate; and
   a condenser lens positioned between said first opaque plate and said at least one second opaque plate so that light bundles which are respectively passed through said plurality of focus detection zones pass through said condenser lens;
   wherein an exit surface of said condenser lens is a circular arc in cross section taken along a plane extending in both a direction of an optical axis of said photographing lens and said first direction, and is a non-circular arc in cross section taken along a plane extending in said direction of said optical axis of said photographing lens and the second direction, so that said exit pupil and said at least one second opaque plate become optically conjugate to each other in said first direction.

* * * * *